United States Patent [19]
Masuhara et al.

[11] Patent Number: 5,272,741
[45] Date of Patent: Dec. 21, 1993

[54] NUCLEAR FUEL ASSEMBLY

[75] Inventors: Yasuhiro Masuhara, Katsuta; Yasunori Bessho, Mito; Yuichiro Yoshimoto, Hitachi, all of Japan

[73] Assignee: Hitachi, Ltd., Tokyo, Japan

[21] Appl. No.: 782,812

[22] Filed: Oct. 25, 1991

[30] Foreign Application Priority Data

Oct. 25, 1990 [JP] Japan .................................. 2-285998

[51] Int. Cl.⁵ .................................................. G21C 3/34
[52] U.S. Cl. ................................... 376/439; 376/441; 376/462
[58] Field of Search ............... 376/439, 441, 451, 462, 376/442; 976/DIG. 76, DIG. 83, DIG. 73, DIG. 68

[56] References Cited

U.S. PATENT DOCUMENTS

| | | | |
|---|---|---|---|
| 3,861,999 | 1/1975 | Zmola et al. ........................ | 376/352 |
| 3,862,000 | 1/1975 | Pugh et al. ......................... | 376/439 |
| 3,933,584 | 1/1976 | Litt .................................... | 376/439 |
| 4,021,300 | 5/1977 | Marshall et al. .................... | 376/462 |
| 4,539,738 | 9/1985 | Antol et al. ........................ | 29/467 |
| 4,698,204 | 10/1987 | Taleyarkhan ....................... | 376/439 |
| 4,827,063 | 5/1989 | Bokers et al. ...................... | 376/439 |
| 5,068,082 | 11/1991 | Ueda et al. ......................... | 376/428 |
| 5,112,571 | 5/1992 | Orii et al. .......................... | 376/439 |

Primary Examiner—Donald P. Walsh
Assistant Examiner—Meena Chelliah
Attorney, Agent, or Firm—Antonelli, Terry, Stout & Kraus

[57] ABSTRACT

A nuclear fuel assembly for a BWR comprises a plurality of fuel rods, a polygonal channel box surrounding the fuel rods, a plurality of spacers axially spaced from each other and each keeping the fuel rods laterally spaced from each other, and a plurality of vanes disposed only in a region at and around a corner within the channel box, for generating swirling flows in the region to thicken a liquid film on each fuel rod in the region.

17 Claims, 6 Drawing Sheets

FIG. 3
FIG. 4
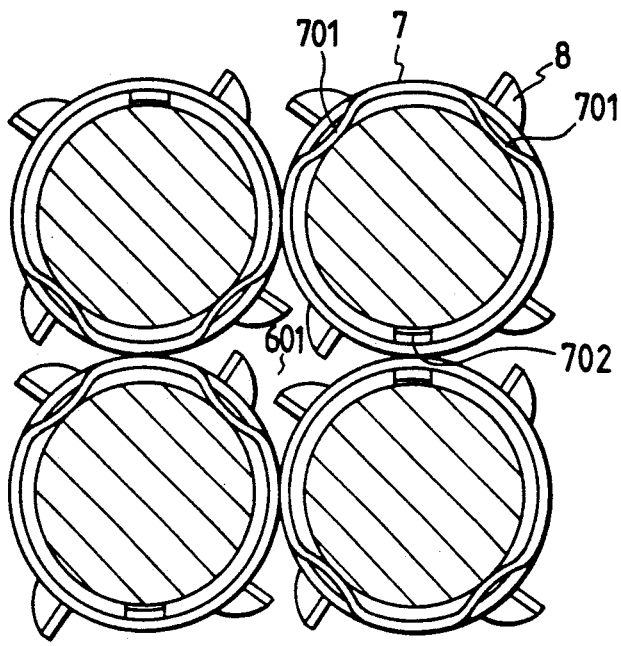
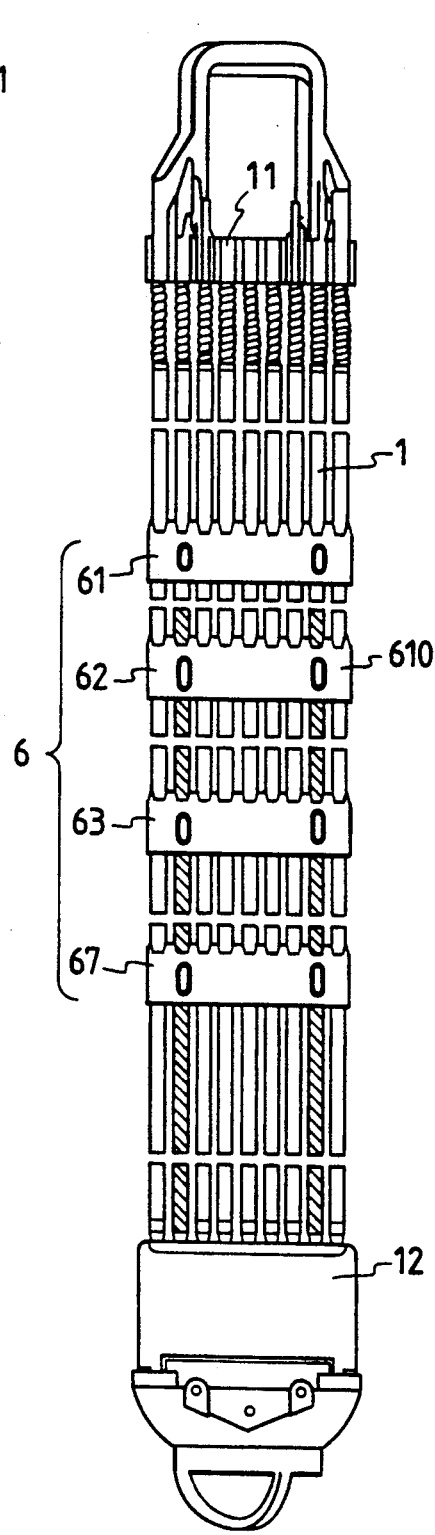

NUCLEAR FUEL ASSEMBLY

BACKGROUND OF THE INVENTION

The present invention relates to a nuclear fuel assembly and, more particularly, to a nuclear fuel assembly for a boiling water reactor having spacer structure improved on heat transfer from fuel rods to the coolant.

Fuel assemblies for nuclear reactors have been improved on spacer structures thereof to increase heat transfer from the fuel rods to the coolant.

In a case of a pressurized water reactor (PWR) as disclosed in U.S. Pat. Nos. 3,395,077 and No. 3,379,619, spacer structures, used for holding the fuel rods to keep them laterally spaced from each other, are directed to improve the heat transfer. The structure is such that, in the center of four sides surrounding fuel rods, a grating type spacer and an obstacle serving as a vane are provided.

In this structure, the coolant flows over the peripheries of the fuel rods so as to cover them due to suitable configuration and mounting positions of the vanes. As a result, the coolant is agitated, the heat transfer increases, thereby raising allowable power level of a reactor core.

The above-described art relates to a PWR. If the spacer structure is used in a boiling water reactor, it is impossible to achieve the above-mentioned effect. In such cases, voids occur in the core of the BWR, and the coolant flows in a two-phase flow. Namely, a liquid film flow takes place on the surface of the fuel rod and a mixture of steam and liquid drops flow in a space region enclosed by fuel rods. Under this two-phase flow condition, if the above-mentioned conventional spacer is used, the coolant flows along the periphery of each fuel rod. Such a flow strips off the liquid film adhered to the fuel rod, thereby decreasing the amount of liquid adhered to the fuel rod in the form of liquid film. Namely, such a coolant flow is likely to cause boiling transition that nucleus boiling changes to film boiling. Therefore, power, that is, allowable power level at the boiling transition decreases.

An example of a BWR fuel assembly having a plurality of vanes is disclosed in U.S. Pat. No. 4,698,204.

The U.S. patent relates to a BWR fuel assembly having an intermediate flow mixing non-support grid. The grid does not support fuel rods to keep them spaced from each other and having vanes at all the fuel rod for mixing relatively cool coolant and relatively hot coolant.

SUMMARY OF THE INVENTION

An object of the invention is to provide a nuclear fuel assembly which has sufficiently high allowable power level and stability.

Another object of the invention is to provide a nuclear fuel assembly which has sufficiently high allowable power level without causing an increase in pressure loss.

The present invention resides in a nuclear fuel assembly for a BWR comprising a plurality of fuel rods, a polygonal channel box surrounding the fuel rods, a plurality of spacers axially spaced from each other and each keeping the fuel rods laterally spaced from each other, and a plurality of vanes disposed only in a region at and around a corner within the channel box, for generating swirling flows in the region to thicken a liquid film on each fuel rod in the region.

According to an aspect of the present invention, the spacers are of round-cell type, and constructed of a plurality of cylindrical cells joined each other, and at least one of the spacers which is disposed in an upper region in which boiling transition is likely to occur comprises vane-formed cylindrical cells having vanes formed on the outer surface thereof and smooth-surface cylindrical cells having no such vanes as mentioned above, the vane-formed cells being disposed, in use, for holding fuel rods in a farther region from a control rod, and the smooth-surface cells being for holding fuel rods in a closer region to the control rod, whereby the thickness of liquid films on the fuel rod in the farther region is thickened and heat transfer from the fuel rods to the coolant increases effectively.

When the above-mentioned vanes are disposed in two phase flow region in the nuclear fuel assembly of the BWR, the vanes generate swirling flows of steam and liquid drops in spaces enclosed by adjacent opposite fuel rods. The liquid drops in the steam are moved to the fuel rods by centrifugal force due to the swirling movement of the liquid drops and adhered to liquid films on the fuel rods, thereby to increase the thickness of the liquid film flows on the fuel rods.

Therefore, thermal allowance to boiling transition is improved and the allowable power level increases. The thermal allowance increases by increasing more the intensity of the swirling movement of the coolant. The increase in the intensity of the swirling movement can be achieved by making the vanes larger in scale, however, the vanes of large scale cause an increase in pressure loss. It is necessary to increase the thermal allowance without increasing the pressure loss.

The boiling transition does not occur at all the fuel rods, but it takes place locally. In general, the position where the boiling transition is likely to occur is one that power is high and thermal conditions are severe. That position is a corner at which fuel rods are positioned and which is farthest from a control rod and in the vicinity of the corner. A typical example of the corner is defined by two sides of the channel box and farthest from the corner defined by other two sides of the channel box which face two sides of a cruciform control rod.

Therefore, when the spacer is constructed so that swirling flows take place only in spaces enclosed by adjacent opposite fuel rods and in spaces between channel box and the fuel rods facing the channel box in the corner region as mentioned above, the thermal allowance is increased without causing pressure loss since the number of vanes used there is small, even if vanes of large scale are employed. Use of the vanes of large scale increases an amount of liquid film flow flowing along the surfaces of the fuel rods. When a large number of vanes are used, projection area of the spacer increases, so that an area of flow passage defined within the spacer is made smaller, as a result, the pressure loss increases.

In the present invention, the number of vanes can be reduced to 15 or less, for example, so that the pressure loss little increases.

As mentioned above, the space where the boiling transition is apt to occur is at and around the corner of the insides of the spacer further from the control rod in a lateral plane. With respect to a vertical position, the boiling transition takes place at the upstream sides of first and second stage spacers from the top side. Usually, a fuel assembly comprises around 7 stage spacers.

The boiling transition is apt to occur around the highest stage spacer. The liquid film thickness decreases from the lowest stage toward the highest stage because the liquid film is evaporated. However, at the spacers, the liquid film increase because the coolant is agitated by the spacers. An aspect of the invention is in that the vanes are provided on the second and third spacers, so that the thickness of liquid film on the fuel rods on which the liquid film is thin increases at the upstream sides of the spacers.

BRIEF DESCRIPTION OF THE INVENTION

FIG. 3 is an enlarged view of a part of FIG. 1;

FIG. 4 is a side view of the fuel assembly shown in FIG. 1 with a channel box being removed;

DESCRIPTION OF EMBODIMENTS OF THE INVENTION

Figure 1:
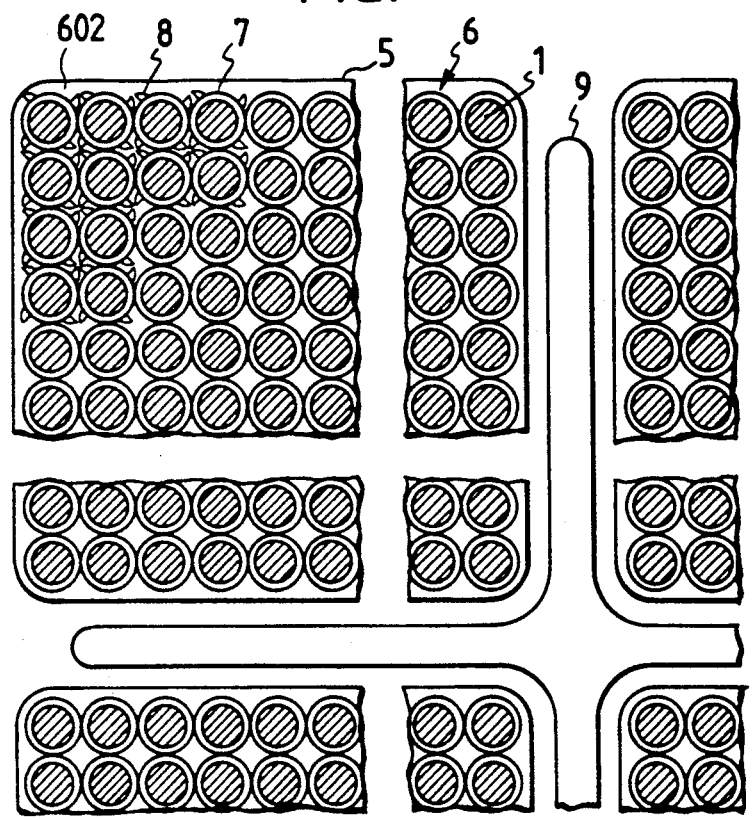
FIG. 1 is a cross-sectional view of a fuel assembly of an embodiment of the present invention.

An embodiment of a fuel assembly according to the present invention will be described hereunder preferring to FIGS. 1 to 4.

In FIG. 4 showing a side view of a nuclear fuel assembly for a BWR with a channel box being removed, the fuel assembly comprises a plurality of fuel rods 1, a plurality of spacer 6, a lower tie plate 12 supporting lower ends of the fuel rods 1, an upper tie plate 11 holding upper ends of the fuel rods 1 and a polygonal channel box 5 (shown in FIG. 1) surrounding the fuel rods 1. The spacers 6 (61 to 67) are of round cell type and arranged in several stages, for example seven stages in longitudinal direction, and named a first stage spacer 61 to a seventh stage spacer 67 from the top.

Some of the spacer 6, for example second upper stage spacer 62 and a third upper spacer 63 each are constructed of cylindrical cells 7 each having vanes 8 on the surfaces thereof and cylindrical cells 7 without vanes. The other stage spacers 61, 64 to 67 are constructed of cylindrical cells 7 having no vanes.

Each of the second and third stage spacers 6 (62, 63) will be described hereunder in detail referring to FIGS. 1 to 3.

The spacer 6 (62 or 63) has a plurality of cylindrical cells 7 arranged in a grid fashion and a side band 610 (shown only in FIG. 4) enclosing the cells 7. Adjacent cylindrical cells 7 are joined together by welding to form rectangular configuration. The fuel rods 1 are inserted into the cylindrical cells 7, respectively, and each fuel rod 1 is supported by two projection 701 projecting inward and a spring 702 which is provided within the cell 7.

In the fuel assembly for a BWR, power becomes higher around a position of fuel rods 1 which are disposed at sides of the spacer 6 which do not face a control rod 9, so that the position is severe in thermal conditions.

In this embodiment, the cylindrical cells 7 with vanes 8 are used for the fuel rods at the above-mentioned position, and the cell 7 with no vanes for the other fuel rods 1. The position is a corner farthest from the control rod 9 which is cruciform and disposed adjacent the fuel assembly so that the two sides of the channel box 5 face the two sides of the control rod 9 as shown in FIG. 1, and around the corner. The corner and its vicinity are defined as a corner region here.

An example of the cell arrangement is such that the cells 7 with vanes 8 are for several fuel rods 1 in two rows along each of the two sides farthest from the control rod 9 as shown in FIG. 1. In FIG. 1, 12 cells 7 each have 4 vanes 8.

Figure 2:
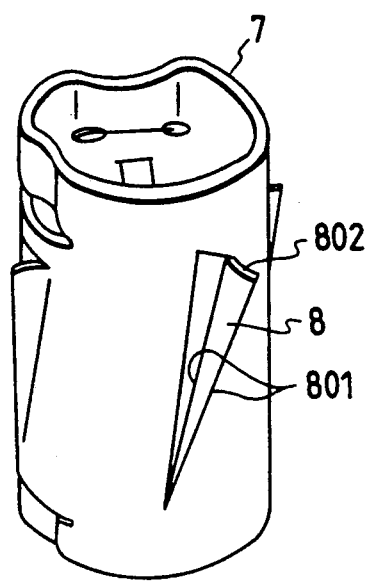
FIG. 2 is a perspective view of a cylindrical cell.

The vanes 8 each has a triangular configuration, as shown in FIG. 2, in which the sides 801 each are much longer than the base 802, one of the sides 801 is on the outer surface of the cylindrical cell 7, with the base 802 being at a downstream side, and a plane defined by the other side and the base projects substantially normally from the outer surface of the cell 7. The vane 8 is oblique to a plane in which the axis of the cell 7 lies.

Figure 5:
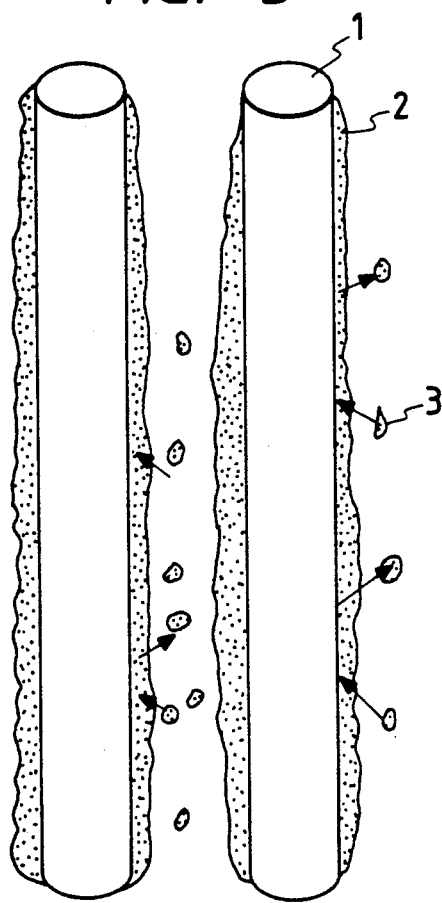
FIG. 5 is an explanatory view of flow conditions of a coolant between fuel rods.

FIG. 5 shows flow condition of coolant between fuel rods 1 of a BWR. The flow is a two-phase flow. Namely, liquid film flow 2 is produced on the surface of the fuel rod 1 and a mixture of steam and liquid drops 3 flows in space between the fuel rods 1. Under the flow conditions, when conventional vanes previously mentioned are employed, the coolant is caused to be flows along the periphery of the fuel rod 1. The flow strips off the liquid film 2 on the fuel rod, so that the liquid film 2 is reduced and the boiling transition is apt to occur. Therefore, power at the boiling transition, that is, allowable power level decreases.

Figure 6:
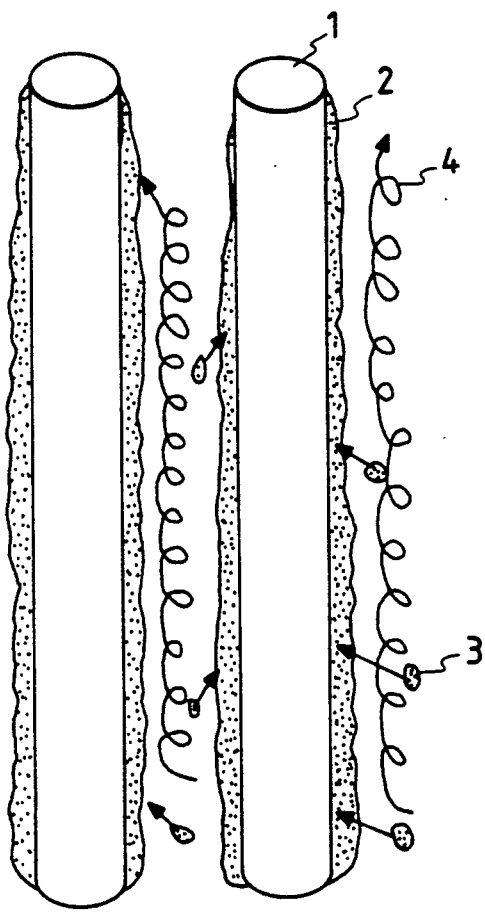
FIG. 6 is an explanatory view of swirling flows of a coolant between fuel rods.

The vanes 8 according to the present invention impart swirling motion to the coolant to generate swirling flows in the spaces 601 defined by adjacent opposite fuel rods 1 and in the spaces 602 defined by the side walls of the channel box 5 and the fuel rods 1 facing the side walls. The swirling flow generated between the fuel rods 1 is a shown by a reference numeral 4 in FIG. 6. By the swirling flow 4, liquid drops 3 in the steam are moved to the liquid layer or film 2 on the outer surface of the fuel rod 1 by centrifugal force, and adhered to the liquid film 2. Therefore, the thickness of the liquid film 2 increases, whereby heat transfer from the fuel rod 1 to the coolant (2) promoted, allowable power level is increases and thermal allowance to the boiling transition increases.

Figure 7:
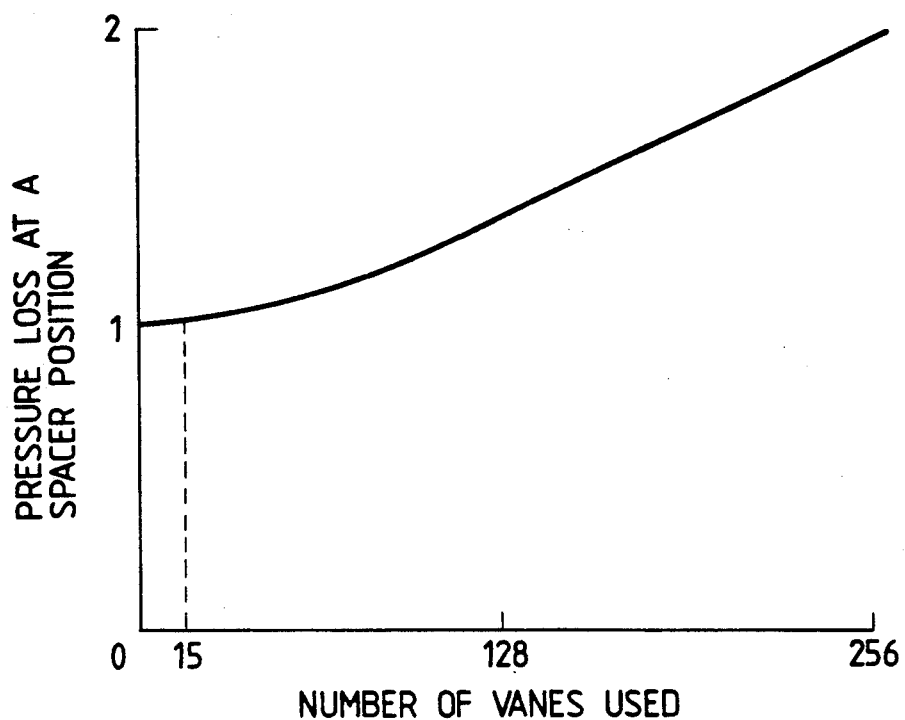
FIG. 7 is a graphical view showing a relation between pressure loss at a spacer position and the number of vanes used for generating swirling flow.

The number of vanes 8 provided for the spacer 6 is limited, so that pressure loss increases as shown in FIG. 7.

The vane 8 can be formed by simply cutting a part of the cell 7, the vane 8 and the cell 7 are formed of one piece and the cells are assembled integrally to be a spacer 6 by welding, so that the spacer 6 has an excellent reliability.

The vane 8 as shown in FIG. 2 has a triangular configuration, however the vane having a rectangular configuration also can obtain similar effects to the above-mentioned one.

Further, even by providing vanes for generating swirling flows at a portion independent of the round type spacer 6, for example, an inner surface of the channel box 5, similar effect can be obtained. The vanes can be provided on the side band 610.

Preferable axial position at which the vanes 8 are disposed was studied. The boiling transition as previously mentioned takes place at the upstream sides of the second stage spacer 62 and the third stage spacer 63 in the upper region. In case the spacers 6 of seven stages are employed, the vanes 8 are provided on the second and third stage spacers 62 and 63. It is found that this construction makes the liquid film 2 thicker with small numbers of vanes 8.

Figure 8:
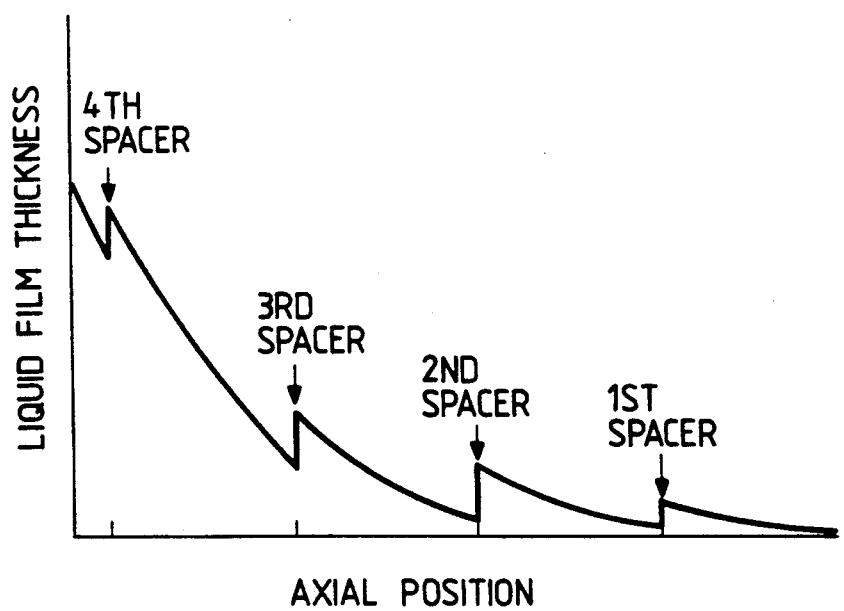
FIG. 8 is a graphical view showing a relation between liquid film thickness and axial positions at which spacers are disposed.
Figure 9:
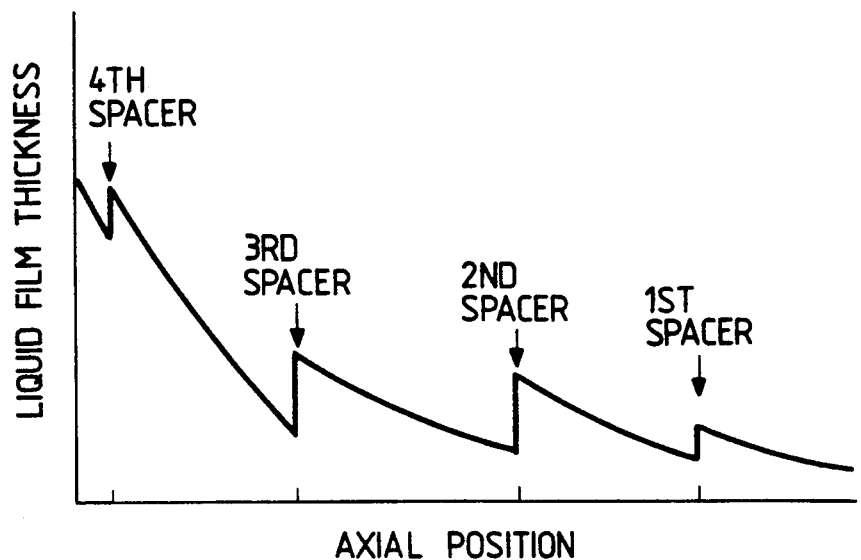
FIG. 9 is a graphical view showing a relation between liquid film thickness and axial positions at which spacers having vanes at second and third upper spacers are positioned.

FIGS. 8 and 9 each show liquid film thickness at each axial position of spacers, wherein FIG. 8 is in case any spacers have no vanes and FIG. 9 is in case only the second and third stage spacers have vanes 8 at and around the corner farthest from the control rod 9. The nuclear fuel assembly shown in FIG. 9 has liquid film increased in thickness as compared with one shown in FIG. 8. Therefore, it is found that the thermal allowance increases.

Figure 10:
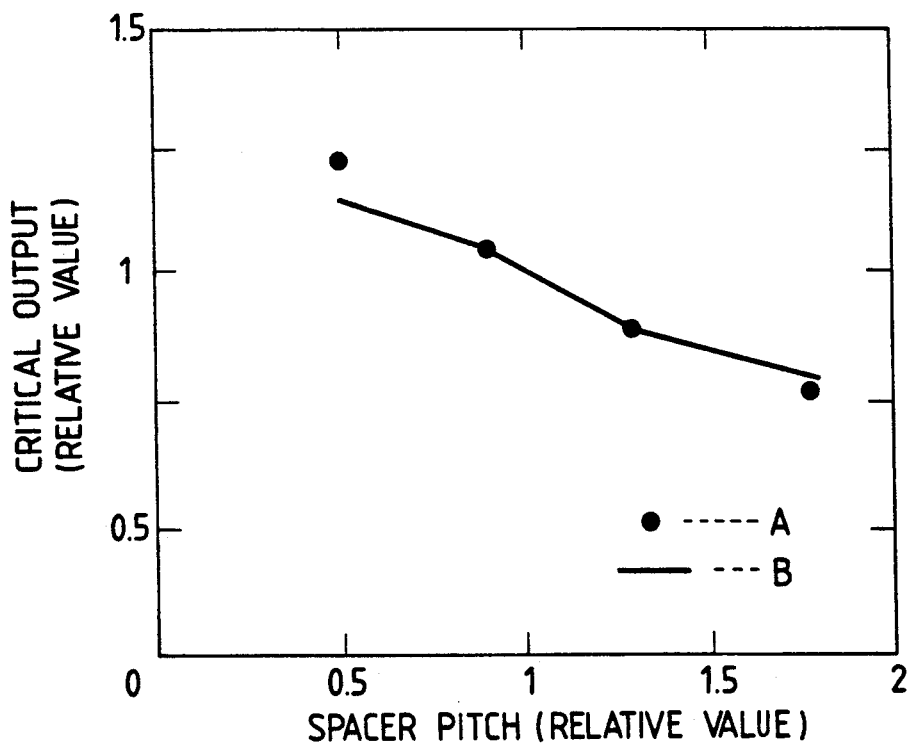
FIG. 10 is a graphical view showing a relation between critical output and spacer pitch.

As mentioned above, the nuclear fuel assembly has relatively small numbers of vanes 8 used. Pressure loss increases as the number of vanes increases as shown in FIG. 7. Therefore, in the fuel assembly according to the present invention pressure loss little increases. Further thermal allowance is improved greatly. Therefore, a method of reducing the pressure loss by utilizing the increment of the thermal allowance was studied. 20% of the pressure loss of the fuel assembly takes place at the round cell type spacers 6. The pressure loss can be reduced drastically by reducing the number of stages of the spacers 6 to six stages from seven stages. However, when the number of spacers 6 is reduced, position intervals of the spacer 6, that is, pitches thereof becomes longer. As is apparent from the relation between the spacer pitches and allowable power, shown in FIG. 10 in which A is experimental value and B is analytical value, the allowable power, that is to say, power at the boiling transition decreases and thermal allowance becomes small. However, when the round cell-type spacers 6 (upper second and upper third stages) according to the present invention are employed, the thermal allowance increases, so that the above-problem is solved, the thermal allowance is beyond one in conventional fuel assemblies, and the pressure loss can be reduced drastically.

Figure 11:
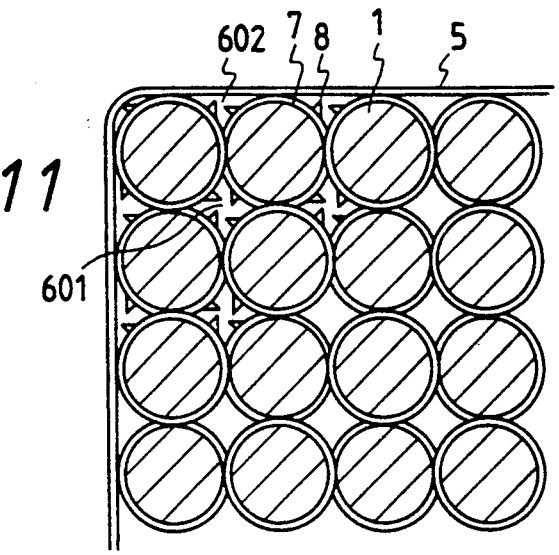
FIG. 11 is a cross-sectional view of a part of a fuel assembly of another embodiment of the present invention.

Another embodiment of the present invention will be described referring to FIGS. 11 and 12.

Parts the same as and corresponding to the previous embodiment are given the same reference numbers.

Figure 12:
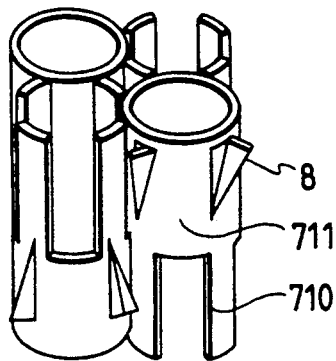
FIG. 12 is a perspective view of cells used for fuel assembly shown in FIG. 11.

In this embodiment, cylindrical cells 7 each have a rectangular cut out portion 710 or portions formed on the cylindrical wall of the cylindrical cells 7 and the cells 7 are inverted alternately and joined so that an axially opposite part 711 to the cut out portion 710 of a cell 7 is inserted to in the cut-out portion of an adjacent cell 7, and the walls of the adjacent cells 7 are overlapped partially in the longitudinal direction, as shown in FIG. 12, in other words, a part of the periphery of a cell 7 is in the periphery of adjacent cell 7. Therefore, projection area of the cells 7 is reduced and the pressure loss is reduced drastically. Vanes 8 are provided on cells 7 which are at and around the corner farthest to the control rod 9 as mentioned previously.

The spacers can be used with 6 stages. In this case, the number of vanes is reduced greatly, so that allowable power level increases with little pressure loss.

Figure 13:
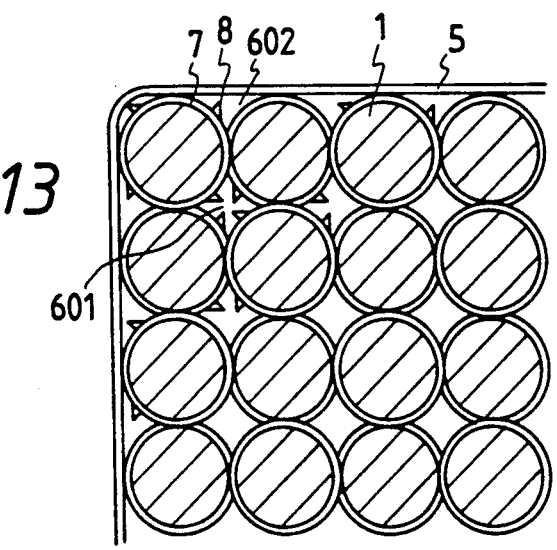
FIG. 13 is a cross-sectional view of a part of a fuel assembly of another embodiment of the present invention.

Further another embodiment is explained referring to FIG. 13.

In FIG. 13, an example of an arrangement of vanes 8 on the spacer 6 is shown. The spacer 6 has one cylindrical cell 7 with 4 vanes 8, one cylindrical cell 7 with 3 vanes 8, 4 cell 7 with 2 vanes 8 and the other cell 7 with no vanes. Therefore the spacer has total 15 vanes. As shown in FIG. 7 there is little pressure loss with the number of vanes 15 or less.

What is claimed is:

1. A nuclear fuel assembly comprising:
a plurality of fuel rods;
a polygonal channel box surrounding said fuel rods;
a plurality of round cell type spacers disposed in several stages in a longitudinal direction within said channel box, each of said spacers having a plurality of cylindrical cells for holding respective ones of said plurality of fuel rods therein and for keeping said fuel rods spaced from each other; and
a plurality of vanes each extending along an outer cylindrical surface of each cylindrical cell in the longitudinal direction with an inclination to the longitudinal direction and disposed only in a corner region at and around a corner, within said channel box, farthest from a corner facing a control rod disposed adjacent to said channel box for imparting swirling motion to fluid flowing along said fuel rods in said region.

2. The nuclear fuel assembly according to claim 1, wherein said vanes generate such swirling flows as direct liquid drops to said fuel rods, in spaces defined by opposite adjacent fuel rods, in spaces defined by said channel box and said fuel rods facing said channel box, in said corner region.

3. The nuclear fuel assembly according to claim 2, wherein and at least one of said round cell type spacers disposed in an upper region of said fuel rods is provided with said vanes formed in said outer cylindrical surfaces of said cylindrical cells in said corner region.

4. The nuclear fuel assembly according to claim 3, wherein said vanes are provided on said round cell spacers of a second upper stage and a third upper stage of said several stages, a first upper stage and other stages of said several stages having cylindrical cells without said vanes.

5. The nuclear fuel assembly according to claim 2, wherein said corner region is defined by adjacent two sides of said round type cell spacer within said channel box and said vanes are provided on said cylindrical cells for fuel rods in first and second rows each of said two sides.

6. The nuclear fuel assembly according to claim 5, wherein said vanes each are provided so as to project substantially normally to said outer cylindrical surface of each cell in said corner region and with an inclination to the axial direction.

7. The nuclear fuel assembly according to claim 2, wherein said cylindrical cells are surrounded and tied by a side band, and said vanes are provided on said side band.

8. The nuclear fuel assembly according to claim 7, wherein said side band with said vanes is provided on each of second and third upper stages of said round cell spacer of said several stages, a first upper stage and other stages of said several stages having a side band without said vanes.

9. The nuclear fuel assembly according to claim 2, wherein said vanes are provided on inner sides of said channel box defining said corner region so as to incline against the longitudinal direction.

10. The nuclear fuel assembly comprising:
a plurality of fuel rods;
a channel box surrounding said fuel rods; and
a plurality of spacers disposed in a plurality of stages in a longitudinal direction of said fuel rods within said channel box for keeping said fuel rods spaced from each other;
wherein at least one of said spacers have a plurality of vane-formed cylindrical cells each having at least one vane on an outer cylindrical surface thereof extending along the outer cylindrical surface in the longitudinal direction for generating swirling fluid flows and disposed at a farther region from a control rod and smooth surface cylindrical cells each without vanes on an outer cylindrical surface thereof and disposed in a closer region to the control rod than the farther region.

11. The nuclear fuel assembly according to claim 10, wherein said channel box is polygonal in cross-section, and said farther region is a corner and an adjacent region to the corner, said corner being defined by two sides of said channel box and farthest from said control rod adjacent to said channel box.

12. The nuclear fuel assembly according to claim 11, wherein said second and third upper stages of said plurality of stages of said spacers have said vane-formed cylindrical cells each having a vane on said outer surface thereof for generating swirling fluid flows in said corner region and smooth surface cylindrical cells having no vane thereon in said closer region other than said corner region, a first upper stage and other states of said plurality of stages of said spaces having smooth surface cylindrical cells.

13. The nuclear fuel assembly according to claim 11, wherein said vanes each are formed on the outer surface of said cell to project therefrom, extend axially and be inclined against a plane on which an axis of said cylindrical cell lie.

14. The nuclear fuel assembly according to claim 11, wherein the number of said vanes is at most 15.

15. The nuclear fuel assembly according to claim 11, wherein said cylindrical walls have rectangular cut out portions extending axially at cylindrical walls thereof, are inverted alternatively and are joined to adjacent cylindrical cells so that the cut out portions receive a part of said cylindrical wall and the assembled two cylindrical cells are partially overlapped axially and laterally.

16. The nuclear fuel assembly according to claim 1, wherein said control rod is disposed at least at a center position among a grouping of four adjacent ones of the nuclear fuel assembly.

17. The nuclear fuel assembly according to claim 10, wherein said control rod is disposed at least at a center position among a grouping of four adjacent ones of the nuclear fuel assembly.

* * * * *